United States Patent
Tanaka

(10) Patent No.: US 6,351,337 B1
(45) Date of Patent: Feb. 26, 2002

(54) THREE-GROUP ZOOM LENS

(75) Inventor: Takashi Tanaka, Kawagoe (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/537,286

(22) Filed: Mar. 29, 2000

(30) Foreign Application Priority Data

Mar. 31, 1999 (JP) ............................................ 11-090762

(51) Int. Cl.$^7$ ............................................... G02B 15/14
(52) U.S. Cl. ........................ 359/684; 359/680; 359/689
(58) Field of Search ................................. 359/680, 682, 359/684, 685, 689

(56) References Cited

U.S. PATENT DOCUMENTS

| | | | |
|---|---|---|---|
| 5,262,897 A | 11/1993 | Kawamura | 359/689 |
| 5,434,710 A | 7/1995 | Zozawa | 359/689 |
| 5,909,318 A * | 6/1999 | Tanaka | 359/689 |

FOREIGN PATENT DOCUMENTS

| | | |
|---|---|---|
| JP | 59-31922 | 2/1984 |
| JP | 10-293253 | 11/1998 |

* cited by examiner

Primary Examiner—Georgia Epps
Assistant Examiner—David N. Spector
(74) Attorney, Agent, or Firm—Arnold International; Bruce Y. Arnold

(57) ABSTRACT

A three-group zoom lens of negative, positive, and positive refractive power, in order from the object side. The first lens group is formed of two lens elements of negative and positive refractive power, respectively, the second lens group includes an aperture stop on its object side, and at least one surface in each of these lens groups is aspherical. When zooming from the wide-angle end to the telephoto end, the distance between the first lens group and the second lens group decreases and both the second and the third lens groups move toward the object side. When changing the focus from an object at an infinite distance to a nearby object the position of the third lens group is shifted. When focused on an object at infinity, the distance between the second lens group and the third lens group is kept substantially constant when zooming from the wide-angle end to the telephoto end. The zoom lens has a zoom ratio of 2.5, provides a high-speed focusing, is compact, and has aberrations that are well-corrected so as to provide a high quality image as a result of satisfying specified conditions.

15 Claims, 3 Drawing Sheets

Spherical Aberration (mm)

Astigmatism (mm)

Distortion (%)

Spherical Aberration (mm)

Astigmatism (mm)

Distortion (%)

Spherical Aberration (mm)

Astigmatism (mm)

Distortion (%)

Spherical Aberration (mm)

Astigmatism (mm)

Distortion (%)

THREE-GROUP ZOOM LENS

BACKGROUND OF THE INVENTION

A three-group zoom lens is known, and has often been used with various types of cameras where a compact size zoom lens having aberrations that are sufficiently well-corrected for many applications is desired. Recently there has been a rapid increase in consumer demand for digital cameras and video cameras. In such cameras a compact zoom lens having high-quality imaging with a low level of distortion is typically required. On the other hand, digital cameras and video cameras utilizing a solid-state image sensor device, such as a CCD array, must have the zoom lens designed to meet specified conditions not necessarily required in other applications.

Automatic focus has become almost a standard feature, and high-speed focusing is generally desired. Because of this, a zoom lens having an "inner-focus" format or a "rear-focus" format is often used. These formats each provide a lightweight zoom lens with the lens elements being positioned near the camera body, thereby enabling the drive-barrel mechanism to be short and efficient. A three-group zoom lens design generally provides much better performance than a two-group zoom lens design and thus is usually preferred.

The present inventor has previously disclosed a design for a three-group zoom lens in Japanese Laid Open Patent Application No. H10-293253. The primary characteristic of the zoom lens disclosed therein is that the entrance aperture is purposefully positioned far from the detecting surface because prior art solid-state image sensor devices, such as CCD arrays, do not efficiently detect light rays unless they are incident almost normal to the detector surface. This is quite different from the case where a photographic film is used as the detector. Therefore, in order to image an object onto the detector surface of a CCD array, the beam of light needs to be radiated at nearly normal incidence to every image position. In other words, it was previously desirable to set the aperture stop (i.e., the radiating pupil) as far as possible from the detector surface (i.e., the image) in order to maximize the detection process.

Recently, a CCD has been developed which will accelerate the development of more compact optical systems. Namely, a CCD has been developed which absorbs light most efficiently when the aperture stop is positioned a limited distance from the image surface. As a result, acceptable absorption occurs where the distance from the aperture stop to the image surface is up to approximately five times the image diameter (where the image diameter is two times the maximum image height).

Concerning the newly developed CCD array, when the aperture stop is far from the image surface, so that the light is incident nearly normally, the efficiency of light absorption decreases. Thus, a three-group zoom lens which is designed to minimize shifting of position of the lens elements when changing magnification has a disadvantage as to this aspect, in that the design is not well-suited for the newly developed CCD array.

On the other hand, Japanese Laid Open Patent Application S59-31922 discloses a different type of zoom lens that uses a 'rear-focus' method with the traditional three-lens-group design. This zoom lens changes the magnification when focusing at a nearby object so that the position of the aperture stop (i.e., the radiating pupil) is situated nearer the imaging surface at the wide-angle end. When maintaining a fixed distance from the aperture stop to the imaging surface, the interval between the second lens group $G_2$ and the third lens group $G_3$ increases at the telephoto end when focusing to infinity. Therefore, the design goal of creating a more compact zoom lens is difficult to accomplish.

In addition, CCD arrays, which are of the type of detector commonly used for electronic still cameras, have rapidly evolved to provide higher density pixels as well as wider-angle views. Recently, a CCD array has been developed having over 200 million pixels. This development trend is expected to increase in the future. Because of this trend, higher resolution imaging will be required of the imaging lens used with this type of electronic still camera.

BRIEF SUMMARY OF THE INVENTION

The present invention is a three-group zoom lens to be used with a solid-state image sensor device as in either a digital camera or a video camera. The zoom lens of the present invention has a zoom ratio of 2.5 as well as high-speed focusing. A first object of the invention is to provide a three-group zoom lens having an overall size that is compact. For example, the length from the most object-side surface of the three-group zoom lens to the image surface is less than 6 times the image diameter, where the image diameter is two times the maximum image height. A second object of the invention is to provide a zoom lens having aberrations that are well-corrected, thereby enabling the image to have a high resolution.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
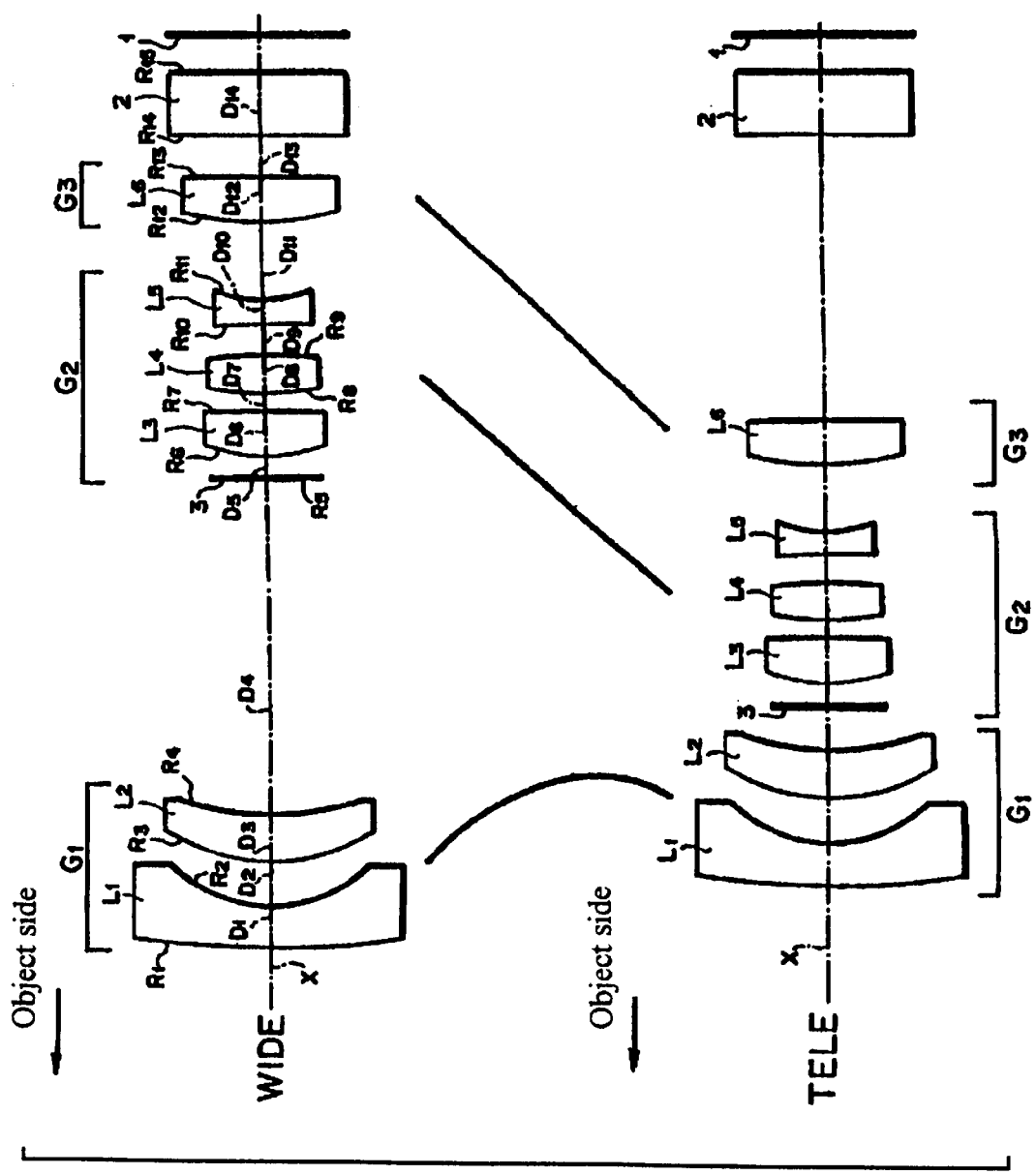
FIG. 1 shows the basic lens element structure of the three-group zoom lens of the invention.

The three-group zoom lens of the invention includes, in order from the object side, a first lens group $G_1$ that has negative refractive power, a second lens group $G_2$ that has positive refractive power, and a third lens group $G_3$ that has positive refractive power. An aperture 3, which adjusts the amount of light in the image, is situated on the object side of, and moves with, the second lens group $G_2$. The solid lines drawn in FIG. 1 between the wide-angle end and the telephoto end indicate the movements of these lens groups while zooming. As is apparent from the figure, when zooming from the wide-angle end to the telephoto end, the spacing between the first lens group $G_1$ and the second lens group $G_2$ decreases markedly. While this occurs, the second lens group $G_2$ and the third lens group $G_3$ are both shifted toward the object side. Additionally, the third lens group $G_3$ also shifts position slightly when focusing on an object at an infinite distance versus a nearby distance.

Lens group $G_1$ is formed of two lens elements having, in order from the object side, a first lens element $L_1$ of negative meniscus shape with its concave surface on the image side, and a second lens element $L_2$ of positive meniscus shape, with its convex surface on the object side.

The second lens group $G_2$ is formed of three lens elements, in order from the object side, as follows: a third lens element $L_3$ that is biconvex with surfaces of different refractive power, with the surface of smaller radius of curvature being on the object side; a fourth lens element $L_4$ that has positive refractive power and a fifth lens element $L_5$ that has negative refractive power, each having opposite surfaces of different curvature, with the surface of smaller radius of curvature on the image side.

Lens group $G_3$ is formed of a single positive lens element having opposite surfaces of different curvature, with the surface of smaller radius of curvature being convex and on the object side.

The first lens element $L_1$ of negative meniscus shape in the first lens group $G_1$ and the two positive lens elements $L_3$ and $L_4$ in the second lens group $G_2$ have one or more aspherical surfaces.

Further, the following Conditions (1) to (7) are preferably satisfied:

$$0.3 < F_W/|f_1| < 0.6 \quad \text{Condition (1)}$$

$$1.1 < F_T/|f_1| < 1.6 \quad \text{Condition (2)}$$

$$0.5 < f_2/f_3 < 1.2 \quad \text{Condition (3)}$$

$$0.15 < D_{2W}/f_3 < 0.25 \quad \text{Condition (4)}$$

$$N_{1n} > 1.68 \quad \text{Condition (5)}$$

$$v_{1n} - v_{1p} > 11 \quad \text{Condition (6)}$$

$$3 < (R_4 + R_3)/(R_4 - R_3) < 10 \quad \text{Condition (7)}$$

where $F_W$ is the focal length of the zoom lens at the wide-angle end, $F_T$ is the focal length of the zoom lens at the telephoto end, $f_1$ is the focal length of the first lens group $G_1$, $f_2$ is the focal length of the second lens group $G_2$, $f_3$ is the focal length of the third lens group $G_3$, $D_{2W}$ is the on-axis spacing, at the wide-angle end, between the second lens group $G_2$ and the third lens group $G_3$.

$N_{1n}$ is the index of refraction of the negative lens element of the first lens group, $v_{1n}$ is the Abbe value of the negative lens element in the first lens group, $v_{1p}$ is the Abbe value of the positive lens element in the first lens group, $R_3$ is the radius of curvature of the object-side surface of the second lens element, and $R_4$ is the radius of curvature of the image-side surface of the second lens element.

When focused on an object at infinity, the three-group zoom lens of this invention keeps the spacing between the second lens group $G_2$ and the third lens group $G_3$ constant when zooming. Therefore, the position of the entrance aperture (i.e., the radiating pupil) is maintained at a proper distance from the image surface. Similarly, it is possible for the three-group zoom lens of this invention to be modified so as to be a 'rear-focus' type lens. The design of the zoom lens of the present invention makes it relatively easy to install a 'focus mount mechanism'. The design of the lens elements therefore allows for the over-all length of the lens to be compact.

Conditions (1) and (2), in effect, control the relative magnification of the zoom lens at the wide-angle end (Condition (1)) and at the telephoto end (Condition (2)) as compared to the magnification of the first lens group. These values define the proper zoom ratio. At the same time, these values enable the zoom lens to be compact while favorably correcting for the various aberrations. That is, when the ratio in Condition (1) is less than the lower limit, the overall length of the zoom lens increases at the wide-angle end, preventing a compact design to be achieved. At the same time, the back focus at the wide-angle end becomes shorter, and the space between the third lens group $G_3$ and the image surface becomes too small for inserting a low-pass spatial filter. On the other hand, when the given ratio exceeds the upper limit of Condition (1), the refractive power of the first lens group becomes excessive, making it difficult to construct the two lens elements of the first lens group $G_1$ When the lower limit of Condition (2) is not satisfied, the distance the first lens group $G_1$ must be shifted to achieve a magnification of 2.5×or more becomes excessive, making it impossible to achieve a compact design. On the other hand, when the upper limit of Condition (2) is not satisfied, the axial spacing of the second lens group $G_1$ becomes overly sensitive, making it difficult to maintain sufficient positioning accuracy of this lens group.

Condition (3) defines the distribution of refractive powers among the second lens group $G_2$ and the third lens group $G_3$. When the lower limit of Condition (3) is not satisfied, the refractive power of the third lens group $G_3$ becomes too small, causing the shift distance to achieve focusing to be too long. When the upper limit of Condition (3) is not satisfied, the refractive power of the third lens group $G_3$ becomes too large, and it becomes difficult to construct this lens group using only a single lens element.

Condition (4) specifies the spacing between the second lens group $G_2$ and the third lens group $G_3$. When the lower limit is not satisfied, the necessary shift space of the third lens group $G_3$ at the telephoto end for focusing becomes excessive. Therefore, referring to FIG. 1, the distance from the aperture stop 3 (hereinafter stop) to the image surface 1 becomes too great for efficient absorption of light to occur using the recently developed CCD arrays discussed above. However, when the upper limit of Condition (4) is exceeded the spacing between the second lens group $G_2$ and the third lens group $G_3$ increases, and this requires that the diameter of each lens element in the third lens group $G_3$ to be larger. Therefore, a compact design becomes difficult to achieve.

Condition (5) defines the refractive power of the negative lens element in the first lens group $G_1$. When the value of $N_{1n}$ does not exceed 1.68, the radius of curvature on the image-side surface of the negative lens element in the first lens group becomes too small. Even when using an aspherical lens element, it becomes difficult to correct for astigmatism and distortion at the wide-angle end.

Condition (6) defines the difference, in Abbe values, between the negative lens element and the positive lens element of the first lens group $G_1$. When the lower limit of Condition (6) is not satisfied, it is difficult to control the lateral color at the wide-angle end. It is also difficult to control the shift of axial chromatic aberration associated with zooming.

Condition (7) defines the so called 'shape factor' of the positive meniscus lens element of the first lens group $G_1$. When outside the specified range, astigmatism at the wide-angle end becomes excessive and it becomes difficult to construct this lens group using only two lens elements.

Two embodiments of the invention will now be given, with the basic lens element structure for each embodiment being shown in FIG. 1.

EMBODIMENT 1

FIG. 1 is a diagram of the lens element structure at the wide-angle end (WIDE) and at the telephoto end (TELE) for the three-group zoom lens of the invention. The movement tracks of each of lens groups $G_1$, $G_2$ and $G_3$, from the wide-angle end to the telephoto end are indicated in FIG. 1. In order from the object side, the first lens group $G_1$ has negative refractive power, the second lens group $G_2$ has positive refractive power, and the third lens group $G_3$ has positive refractive power. The first lens group $G_1$ and the second lens group $G_2$ are movable for zooming. When focusing from the infinity to nearby, the third lens group $G_3$ is designed to shift position toward the object side. Thus, all three lens groups $G_1$, $G_2$ and $G_3$ are moveable along the optical axis X, and a beam of light is efficiently converged onto the imaging surface 1.

The first lens group $G_1$ is formed, in order from the object side, of a first lens element $L_1$ and a second lens element $L_2$. The first lens element $L_1$ has a negative meniscus shape with its concave surface on the image side. The second lens element $L_2$ has a positive meniscus shape with its convex surface on the object side.

The second lens group $G_2$ is formed, in order from the object side, of a third lens element $L_3$, a fourth lens element $L_4$ and a fifth lens element $L_5$. The third lens element $L_3$ is biconvex having surfaces of different curvature, with the surface of smaller radius of curvature on the object side. The fourth lens element $L_4$ is biconvex having surfaces of different curvature, with the surface of smaller radius of curvature on the object side. The fifth lens element $L_5$ is biconcave, having surfaces of different curvature, with the surface of smaller radius of curvature on the image side.

The third lens group $G_3$ is formed of a sixth lens element $L_6$ having a positive meniscus shape with its convex surface on the object side.

A filter section 2, which may include a low-pass filter and/or an infrared blocking filter, is placed between the sixth lens element $L_6$ and the image surface 1 (i.e., the detecting surface of the CCD array).

Table 1 below lists, for Embodiment 1, the surface number #, in order from the object side, the radius of curvature R (in mm) of each surface, the on-axis surface spacing D, as well as the index of refraction $N_d$ and the Abbe number $\upsilon_d$ (at the sodium d line) of each lens element. The bottom portion of the table lists the focal length f of the zoom lens at the wide-angle end (7.05 mm), and at the telephoto end (19.74 mm), as well as the $F_{NO}$ and the image angle $2\omega$ at each of the wide-angle and telephoto ends, respectively.

TABLE 1

| # | R | D | $N_d$ | $\upsilon_d$ |
|---|---|---|---|---|
| 1* | 67.160 | 1.94 | 1.80610 | 40.7 |
| 2 | 5.998 | 2.17 | | |
| 3 | 8.078 | 2.26 | 1.84665 | 23.8 |

TABLE 1-continued

| # | R | D | $N_d$ | $\upsilon_d$ |
|---|---|---|---|---|
| 4 | 12.316 | D4 (variable) | | |
| 5 | ∞ (stop) | 1.02 | | |
| 6* | 7.333 | 2.20 | 1.59380 | 61.4 |
| 7 | −40.541 | 0.84 | | |
| 8* | 13.712 | 1.87 | 1.59380 | 61.4 |
| 9* | −19.337 | 1.35 | | |
| 10 | −60.842 | 1.10 | 1.84665 | 23.8 |
| 11 | 5.191 | D11 (variable) | | |
| 12 | 11.664 | 2.07 | 1.69894 | 30.1 |
| 13 | 202.093 | D13 (variable) | | |
| 14 | ∞ | 3.00 | 1.51680 | 64.2 |
| 15 | ∞ | | | | f = 7.05–19.74   $F_{NO}$ = 3.51–5.62   $2\omega$ = 62.9°–23.2°

Table 2 below lists, for this embodiment the values (in mm) of D4, D11, and D13 (i.e., the spacings between the lens groups) for an object at infinity and nearby, for the zoom lens at the wide-angle end and the telephoto end, respectively. The distance labeled "nearby" is for an object positioned 0.2 meters from the on-axis position of surface # 1.

TABLE 2

| | OBJECT AT INFINITY | | OBJECT NEARBY | |
|---|---|---|---|---|
| | WIDE | TELE | WIDE | TELE |
| D4 | 16.19 | 2.09 | 16.19 | 2.09 |
| D11 | 3.69 | 3.69 | 3.32 | 1.62 |
| D13 | 2.00 | 12.98 | 2.37 | 15.05 |

Those surfaces with a * to the right of the surface number in Table 1 above are aspherical surfaces, and the aspherical surface shape is expressed by Equation (A) below.

$$Z = CY^2/\{1+(1+K)C^2Y^2)^{1/2}\} + A_4Y^4 + A_6Y^6 + A_8Y^8 + A_{10}Y^{10} \quad \text{(Equation A)}$$

where

Z is the length (in mm) of a line drawn from a point on the aspherical surface at a distance Y from the optical axis to the tangential plane of the aspherical surface vertex, C ($\approx 1/R$) is the curvature of the aspherical surface near the optical axis, Y is the distance (in mm) from the optical axis, K is the eccentricity, and $A_4$, $A_6$, $A_8$, and $A_{10}$, are the 4th, 6th, 8th, and 10th aspherical coefficients.

The values of each of the constants K and $A_4$–$A_{10}$ for the aspherical surfaces indicated in Table 1 are shown in Table 3 below.

TABLE 3

| # | K | $A_4$ | $A_6$ | $A_8$ | $A_{10}$ |
|---|---|---|---|---|---|
| 1 | 0.09085 | $9.23161 \times 10^{-5}$ | $5.13572 \times 10^{-7}$ | $1.54307 \times 10^{-9}$ | $5.23467 \times 10^{-11}$ |
| 6 | −1.03466 | $1.14157 \times 10^{-4}$ | $-4.40343 \times 10^{-6}$ | $-1.50076 \times 10^{-8}$ | $-9.51419 \times 10^{-11}$ |
| 8 | −0.37537 | $-5.94183 \times 10^{-4}$ | $-1.53468 \times 10^{-6}$ | $-9.71282 \times 10^{-9}$ | $-5.45055 \times 10^{-11}$ |
| 9 | −2.01293 | $-2.16700 \times 10^{-4}$ | $1.29716 \times 10^{-6}$ | $5.46750 \times 10^{-9}$ | $-7.27697 \times 10^{-11}$ |

Figure 2A:
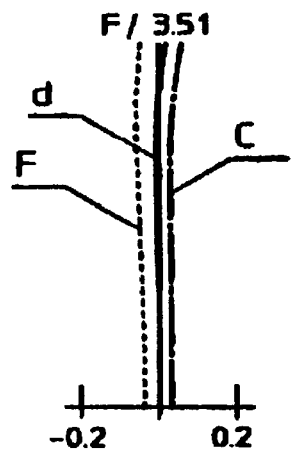
FIGS. 2A–2F show the spherical aberration (for the C, d and F lines), the astigmatism (in both the sagittal S and tangential T planes), and the distortion at both the wide-angle end (FIGS. 2A–2C, respectively) and the telephoto end (FIGS. 2D–2F, respectively) of the zoom lens according to Embodiment 1 of the invention.
Figure 2B:
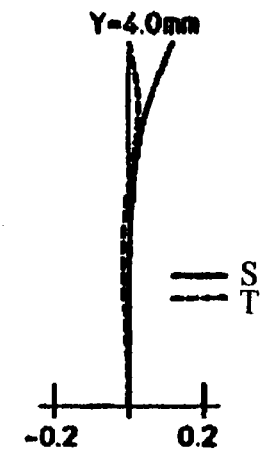
Figure 2C:
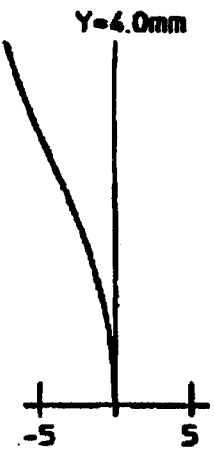
Figure 2D:
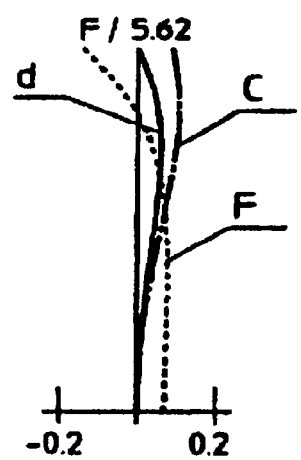
Figure 2E:
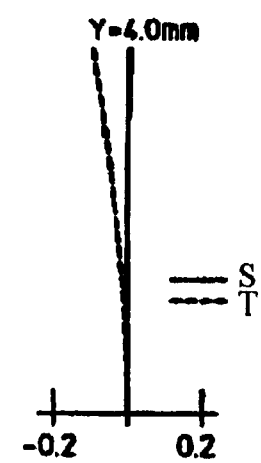
Figure 2F:

FIGS. 2A–2F illustrate various aberrations for Embodiment 1 of the invention. FIGS. 2A–2C show the spherical aberration (for the d, F, and C lines), astigmatism (in the sagittal S and tangential T planes), and distortion, respectively, at the wide-angle end, and FIGS. 2D–2F show these same aberrations at the telephoto end. As is apparent from these aberration curves, Embodiment 1 favorably corrects for these aberrations throughout the entire range of zooming.

Further, each of the above-mentioned Conditions (1) to (7) are satisfied.

EMBODIMENT 2

The zoom lens of this embodiment has a construction similar to that of Embodiment 1, with the following exceptions. The fourth lens element $L_4$ in this embodiment is biconvex having surfaces of different radius of curvature, with the surface of smaller radius of curvature on the image side. Also, the sixth lens element $L_6$ is biconvex having surfaces of different radius of curvature, with the surface of smaller radius of curvature on the object side.

Table 4 below lists, for Embodiment 2, the surface number #, in order from the object side, the radius of curvature R (in mm) of each surface, the on-axis surface spacing D, as well as the index of refraction $N_d$ and the Abbe number $\upsilon_d$ (at the sodium d line) of each lens element. The bottom portion of the table lists the focal length f of the zoom lens at the wide-angle end (f=6.91 mm), and at the telephoto end (f=17.27 mm), as well as the $F_{NO}$ and the image angle 2ω at each of the wide-angle and telephoto ends, respectively.

TABLE 4

| # | R | D | $N_d$ | $\upsilon_d$ |
|---|---|---|---|---|
| 1* | 23.413 | 2.00 | 1.74330 | 49.3 |
| 2 | 5.936 | 2.49 | | |
| 3* | 11.059 | 2.29 | 1.80518 | 25.5 |
| 4* | 15.241 | D4 (variable) | | |
| 5 | ∞ (stop) | 1.00 | | |
| 6* | 5.914 | 1.98 | 1.69350 | 53.2 |
| 7 | −51.916 | 0.15 | | |
| 8* | 33.038 | 2.03 | 1.59380 | 61.4 |
| 9* | −13.384 | 0.29 | | |
| 10 | −21.131 | 0.70 | 1.69894 | 30.1 |
| 11 | 4.407 | D11 (variable) | | |
| 12 | 10.013 | 2.12 | 1.51823 | 58.9 |
| 13 | −50.945 | D13 (variable) | | |
| 14 | ∞ | 3.00 | 1.51680 | 64.2 |
| 15 | ∞ | | | | f = 6.91–17.27    $F_{NO}$ = 3.21–4.59    2ω = 64.1°–26.4°

Table 5 below lists, for this embodiment the values (in mm) of D4, D11, and D13 (i.e., the spacings between the lens groups) for an object at infinity and nearby, for the zoom lens at the wide-angle end and the telephoto end, respectively. The distance labeled "nearby" is for the object positioned 0.2 meters from the on-axis position of surface # 1.

TABLE 5

| | OBJECT AT INFINITY | | OBJECT NEARBY | |
|---|---|---|---|---|
| | WIDE | TELE | WIDE | TELE |
| D4 | 17.55 | 2.18 | 17.55 | 2.18 |
| D11 | 3.06 | 3.06 | 2.78 | 1.50 |
| D13 | 2.00 | 9.85 | 2.28 | 11.41 |

The values of each of the constants K and $A_4$–$A_{10}$ for the aspherical surfaces indicated in Table 4 above are shown in Table 6 below.

TABLE 6

| # | K | $A_4$ | $A_6$ | $A_8$ | $A_{10}$ |
|---|---|---|---|---|---|
| 1 | 0.06012 | $6.58996 \times 10^{-5}$ | $-1.20277 \times 10^{-7}$ | $-1.95387 \times 10^{-8}$ | $1.71622 \times 10^{-10}$ |
| 3 | 2.14424 | $-4.99897 \times 10^{-4}$ | $-2.89848 \times 10^{-6}$ | $1.47534 \times 10^{-8}$ | $5.65755 \times 10^{-12}$ |
| 4 | −1.27497 | $-5.00231 \times 10^{-4}$ | $2.84148 \times 10^{-7}$ | $-3.81961 \times 10^{-8}$ | $-2.40974 \times 10^{-10}$ |
| 6 | −0.84213 | $1.19717 \times 10^{-4}$ | $4.29550 \times 10^{-7}$ | $2.92038 \times 10^{-9}$ | $-9.66526 \times 10^{-11}$ |
| 8 | −0.01455 | $-3.76672 \times 10^{-4}$ | $-2.71478 \times 10^{-7}$ | $-9.73090 \times 10^{-11}$ | $-7.09190 \times 10^{-11}$ |
| 9 | −2.80311 | $1.31626 \times 10^{-4}$ | $-1.94544 \times 10^{-6}$ | $-5.85132 \times 10^{-9}$ | $-1.36020 \times 10^{-10}$ |

Figure 3A:
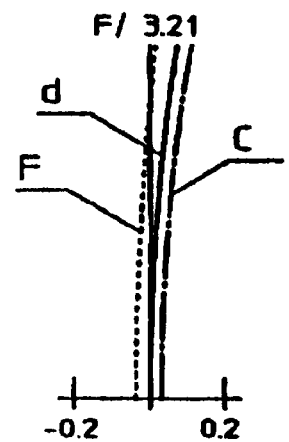
FIGS. 3A–3F show the spherical aberration (for the C, d and F lines), the astigmatism (in both the sagittal S and tangential T planes), and the distortion at both the wide-angle end (FIGS. 3A–3C, respectively) and the telephoto end (FIGS. 3D–3F, respectively) of the zoom lens according to Embodiment 2 of the invention.
Figure 3B:
Figure 3C:
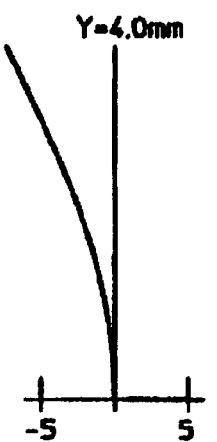
Figure 3D:
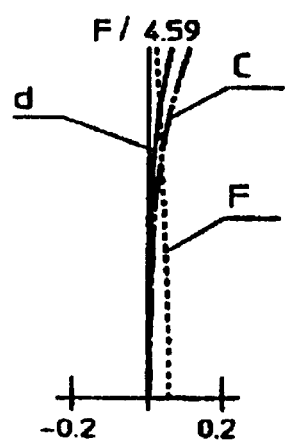
Figure 3E:
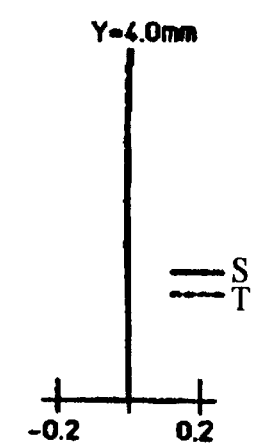
Figure 3F:

FIGS. 3A–3F illustrate various aberrations for Embodiment 2 of the invention. FIGS. 3A–3C show the spherical aberration (for the d, F, and C lines), astigmatism (in the sagittal S and tangential T planes), and distortion, respectively, at the wide-angle end, and FIGS. 3D–3F show these same aberrations at the telephoto end. As is apparent from these aberration curves, Embodiment 2 favorably corrects for these aberrations throughout the entire range of zooming. Further, each of the above-mentioned Conditions (1) to (7) are satisfied.

Table 7 below lists the values, for Conditions (1)–(7), in Embodiments 1 and 2.

TABLE 7

|  | Embodiment 1 | Embodiment 2 |
|---|---|---|
| Condition (1) value: | 0.53 | 0.45 |
| Condition (2) value: | 1.48 | 1.13 |
| Condition (3) value: | 0.69 | 0.92 |
| Condition (4) value: | 0.21 | 0.19 |
| Condition (5) value: | 1.81 | 1.74 |
| Condition (6) value: | 16.9 | 23.8 |
| Condition (7) value: | 4.81 | 6.29 |

As explained above, when focusing on an object at infinity, the three-group zoom lens of this invention keeps the distance between the second lens group $G_2$ and the third lens group $G_3$ substantially constant when zooming from the wide-angle end to the telephoto end. Therefore, the aperture stop (i.e., the radiating pupil) is positioned at a proper distance from the image surface. Similarly, it is possible to adapt the zoom lens to be of the 'rear-focus' type.

The first lens group $G_1$ is formed, in order from the object side, of two lens elements of negative and positive refractive power, respectively. In addition, one or more aspherical surfaces are used in the first lens group $G_1$ and the second lens group $G_2$, to reduce the number of surfaces required to correct for various aberrations and thereby enable the zoom lens to be compact. Each lens group of the zoom lens of this invention shifts position simultaneously. Such a design makes it relatively easy to install a "focus mount" mechanism, and the positioning of the lens elements allows for a shorter over-all length. By satisfying Conditions (1)–(7), the zoom lens has a zoom ratio of 2.5 and high-speed focusing is achieved. Further, the three-group zoom lens of the present invention enables the overall length of the zoom lens to be compact, with the total length from the object side of the zoom lens to the image surface being less than six times the largest diameter (i.e., less than 12 times the image height) and the various aberrations are favorably corrected so as to provide a zoom lens of high resolution.

The invention being thus described, it will be obvious that the same may be varied in many ways. For example changing the number of lens elements in a particular lens group may be varied. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. A zoom lens formed of only three lens groups, in sequential order from the object side, as follows:
    a first lens group of negative refractive power, said first lens group consisting of two lens elements of negative and positive refractive power, respectively, in order from the object side, at least one of said two lens elements including a surface that is aspherical;
    a second lens group of positive refractive power and that includes a stop, said second lens group including a surface that is aspherical; and
    a third lens group of positive refractive power, wherein
    when zooming from the wide-angle end to the telephoto end, the distance between the first lens group and the second lens group decreases and both the second and the third lens groups move toward the object side;
    when changing the focus from an object at an infinite distance to a nearby object the position of the third lens group is shifted; and
    when focused on an object at infinity, the distance between the second lens group and the third lens group is kept substantially constant when zooming from the wide-angle end to the telephoto end.

2. The zoom lens of claim 1, wherein the following condition is satisfied $$0.3<F_W/|f_1|<0.6$$

where
    $F_W$ is the focal length of the zoom lens at the wide-angle end, and
    $f_1$ is the focal length of the first lens group.

3. The zoom lens of claim 1, wherein the following condition is satisfied $$1.1<F_T/|f_1|<1.6$$

where
    $F_T$ is the focal length of the zoom lens at the telephoto end, and
    $f_1$ is the focal length of the first lens group.

4. The zoom lens of claim 1, wherein the following condition is satisfied $$0.5<f_2/f_3<1.2$$

where
    $f_2$ is the focal length of the second lens group, and
    $f_3$ is the focal length of the third lens group.

5. The zoom lens of claim 1, wherein the following condition is satisfied $$0.15<D_{2W}/f_3<0.25$$

where
    $D_{2W}$ is the on-axis spacing, at the wide-angle end, between the second lens group and the third lens group, and
    $f_3$ is the focal length of the third lens group.

6. The three-group zoom lens of claim 1 wherein the said two lens elements of the first lens group are, in order from the object side, a negative meniscus lens with its concave surface on the image side, and a positive meniscus lens with its convex surface on the object side.

7. The three-group zoom lens of claim 1, wherein the second lens group includes three lens elements, in order from the object side, as follows:
    a positive lens element that is biconvex having surfaces of different radius of curvature, with the surface of smaller radius of curvature on the object side,
    a positive lens clement that is biconvex having surfaces of different radius of curvature, with the surface of smaller radius of curvature on the image side, and
    a negative lens element that is biconcave, having surface of different radius of curvature, with the surface of smaller radius of curvature on the image side.

8. The three-group zoom lens of claim 7, wherein each of said two positive lens elements in the second lens group have one or more aspherical surfaces.

9. The three-group zoom lens of claim 8, wherein the third lens group consists of a lens element that is biconvex having surfaces of different radius of curvature, with the surface of smaller radius of curvature on the object side.

10. The three-group zoom lens of claim 1, wherein the third lens group consists of a positive refractive lens element having a convex surface on the object side.

11. The three-group zoom lens of claim 1, wherein said negative lens element in the first lens group has a meniscus shape.

12. The three-group zoom lens of claim 1, wherein said stop is arranged nearest the object side within the second lens group.

13. The three-group zoom lens of claim 1, wherein the following condition is satisfied $$N_{1n} < 1.68$$

where $N_{1n}$ is the index of refraction of the negative lens element in the first lens group.

14. The three-group zoom lens of claim 1, wherein the following condition is satisfied $$v_{1n} - v_{1p} > 11$$

where $v_{1n}$ is the Abbe value of the negative lens element in the first lens group, and $v_{1p}$ is the Abbe value of the positive lens element in the first lens group.

15. The three-group zoom lens of claim 1, wherein the following condition is satisfied $$3 < (R_4 + R_3)/(R_4 - R_3) < 10$$

where $R_3$ is the radius of curvature of the surface on the object side of the positive meniscus lens element of the first lens group, and $R_4$ is the radius of curvature of the surface on the image side of the positive meniscus lens element of the first lens group.

\* \* \* \* \*

UNITED STATES PATENT AND TRADEMARK OFFICE
CERTIFICATE OF CORRECTION

PATENT NO.    : 6,351,337 B1
DATED         : February 26, 2002
INVENTOR(S)   : Takashi Tanaka It is certified that error appears in the above-identified patent and that said Letters Patent is hereby corrected as shown below:

Column 3,
Line 53, change "$G_3.$" to -- $G_3,$ --;

Column 4,
Line 24, change "$G_1$ When" to -- $G_1.$ When --;
Line 27, change "2.5xor" to -- 2.5X or --;
Line 30, change "$G_1$" to -- $G_2$ --;

Column 5,
Line 28, change "$L_2,$" to -- $L_2.$ --;
Line 35, change "$L_4$" to -- $L_4,$ --;

Column 6,
Line 45, change the equation to the following:

-- $Z = CY^2 / \{1 + (1 - (1+K)C^2Y^2)^{1/2}\} + A_4Y^4 + A_6Y^6 + A_8Y^8 + A_{10}Y^{10} \ldots$ (Equation A) --;

Line 56, change "C ($\approx$ 1/R)" to -- C (=1/R) --;

Column 10,
Line 34, change the listed condition to the following:  -- $0.15 < D_{2w} / f_3 < 0.25$ --;
and Column 11,
Line 19, change the listed condition to the following:  -- $v_{1n} - v_{1p} > 11$ --.

Signed and Sealed this

Fifth Day of November, 2002

Attest:

Attesting Officer

JAMES E. ROGAN
Director of the United States Patent and Trademark Office